US012217284B2

(12) United States Patent
Karia et al.

(10) Patent No.: US 12,217,284 B2
(45) Date of Patent: Feb. 4, 2025

(54) MATCHING PROMOTIONS TO TELECOM USER PREFERENCES USING ARTIFICIAL INTELLIGENCE

(71) Applicant: INTERNATIONAL BUSINESS MACHINES CORPORATION, Armonk, NY (US)

(72) Inventors: Jignesh K Karia, Thane (IN); Mukundan Sundararajan, Bangalore (IN); Pankaj Satyanarayan Dayama, Bangalore (IN); Shilpa Shetty, Bangalore (IN); Neha Shah, Kolkata (IN); Vishal Awal, Mumbai (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 17/506,166

(22) Filed: Oct. 20, 2021

(65) Prior Publication Data
US 2023/0325883 A1     Oct. 12, 2023

(51) Int. Cl.
*G06Q 30/0251*     (2023.01)
*G06Q 30/0241*     (2023.01)
*G06Q 30/08*     (2012.01)

(52) U.S. Cl.
CPC ..... *G06Q 30/0269* (2013.01); *G06Q 30/0261* (2013.01); *G06Q 30/0276* (2013.01); *G06Q 30/08* (2013.01)

(58) Field of Classification Search
CPC . G06Q 30/0207–0277; G06Q 30/0269; G06Q 30/0261; G06Q 30/0276; G06Q 30/08

USPC ........ 705/14.66, 14.61; 455/432.1; 340/5.64
See application file for complete search history.

(56) References Cited

U.S. PATENT DOCUMENTS

| 9,247,414 | B2 | 1/2016 | Shkut et al. | |
| 10,356,147 | B2 | 7/2019 | Drapeau et al. | |
| 2006/0224525 | A1* | 10/2006 | Dahlin | G06Q 30/00 705/80 |

(Continued)

OTHER PUBLICATIONS

Bics, End-to-end guide: How to use big data to maximize your roaming business, 2021 (Year: 2021).*

(Continued)

*Primary Examiner* — Tarek Elchanti
(74) *Attorney, Agent, or Firm* — Tutunjian & Bitetto, P.C.; Michael A. Petrocelli (57) ABSTRACT

Promotional offers are offered to telecom subscribers in roaming network areas by recording promotional preferences of subscribers for receiving promotional calls, forwarding subscriber information from a local network telecom service provider to a roaming network service provider, and measuring with the roaming network telecom service provider the subscribers that are present within a roaming network geography. The subscribers can then be ranked by their duration within the roaming network geography, and promotional pools can be generated for the subscribers within the roaming network based on their preferences. Promotional offers can then be matched to the subscribers in the promotional pools based using the ranking of subscribers and the promotional preferences.

17 Claims, 6 Drawing Sheets

(56) References Cited

U.S. PATENT DOCUMENTS

| | | | | |
|---|---|---|---|---|
| 2007/0258460 | A1* | 11/2007 | Momtahan | H04L 47/808 370/395.2 |
| 2008/0007388 | A1* | 1/2008 | Au | G06Q 20/346 340/5.64 |
| 2008/0070550 | A1* | 3/2008 | Hose | H04L 51/52 455/433 |
| 2009/0082019 | A1* | 3/2009 | Marsico | H04W 48/18 455/435.2 |
| 2009/0132364 | A1* | 5/2009 | Agarwal | G06Q 30/02 705/14.61 |
| 2012/0020253 | A1* | 1/2012 | Brahmbhatt | H04W 4/16 370/259 |
| 2014/0179307 | A1* | 6/2014 | So | H04W 8/20 455/432.1 |
| 2014/0180822 | A1* | 6/2014 | Peebles | G06Q 30/0267 705/14.64 |
| 2014/0207603 | A1* | 7/2014 | Orenstein | H04L 51/24 705/26.1 |
| 2015/0039448 | A1* | 2/2015 | Byrne | G06Q 30/0275 705/14.71 |
| 2015/0242903 | A1* | 8/2015 | Peebles | H04W 4/24 705/14.64 |
| 2015/0244537 | A1* | 8/2015 | Paquette | H04M 15/8083 370/259 |
| 2016/0338120 | A1* | 11/2016 | Boyle | H04L 65/4015 |
| 2018/0342036 | A1* | 11/2018 | Zachary | H04W 12/10 |
| 2020/0045519 | A1* | 2/2020 | Raleigh | H04M 15/765 |
| 2022/0076851 | A1* | 3/2022 | Kamangar | G06Q 30/0633 |

OTHER PUBLICATIONS

Mell, Peter, et al., "The NIST Definition of Cloud Computing," Sep. 2011, 7 pages.

Krishnamoorthy, Parameswaran Thrissur, et al., "Method and System for Displaying Sponsored Content for a Travelling User," https://ip.com/IPCOM/000248542, Dec. 2016, 3 pages.

Anonymous, "Method and System for Location Driven Personalized Advertisement for Mobile Users," https://ip.com/IPCOM/000261103, Jan. 2020, 6 pages.

* cited by examiner

MATCHING PROMOTIONS TO TELECOM USER PREFERENCES USING ARTIFICIAL INTELLIGENCE

BACKGROUND

The present invention generally relates to telecommunications, and more particularly to sending promotional messages through telecommunications.

An organization wishing to send certain promotional communications to a subscriber reaches to a telecommunications service provider (TSP) through a telemarketer to send the message. The request initiator is the organization looking to promote its brand. The request is received at the telecommunications service provider (TSP), scrubbing is performed on the subscriber list based on user preference, and consent, and then sending the promotional message is triggered.

When a subscriber is in roaming, e.g., either using a number of the travelling location or using their own number with international roaming facility, based on the user's preferences can receive a promotion message. The process for receiving a promotional message during roaming is initiated by the organization, which submits the list of subscribers along with the request. This list is scrubbed before sending a communication based on user preference/consent.

SUMMARY

In accordance with an embodiment of the present invention, a computer-implemented method is provided for making promotional offers to telecom subscribers in roaming network areas. In one embodiment, the method may include recording the promotional preferences of subscribers for receiving promotional calls. In a following step, an agreement is made between a local network telecom service provider and a roaming network telecom service provider, in which subscriber identification is forwarded to the roaming network service provider. The roaming network telecom service provider can then measure when subscribers are present within a roaming network geography. Subscribers can be ranked in the roaming network geography by their duration within the region. Promotion pools can be generated for the subscribers within the roaming network based on their preferences. Promotional offers are then matched to the subscribers in the promotional pools.

In accordance with another embodiment of the present disclosure, a system is provided making promotional offers to telecom subscribers in roaming network areas. The system can include a hardware processor; and a memory that stores a computer program product. The computer program product when executed by the hardware processor, causes the hardware processor to record promotional preferences of subscribers for receiving promotional calls. The computer program product can also forward subscriber information from a local network telecom service provider to a roaming network service provider, and measure with the roaming network telecom service provider the subscribers that are present within a roaming network geography. In some embodiments, the system can rank subscribers in the roaming network geography by their duration within the roaming network geography. The system using the hardware process can also generate promotion pools for the subscribers within the roaming network based on their preferences, and match promotional offers to the subscribers in the promotional pools based using the ranking of subscribers and the promotional preferences.

In accordance with yet another embodiment of the present disclosure, a computer program product is described. The computer program product can make promotional offers to telecom subscribers in roaming network areas using a computer readable storage medium having computer readable program code embodied therewith. The program instructions are executable by a processor to cause the processor to record promotional preferences of subscribers for receiving promotional calls; and forward subscriber information from a local network telecom service provider to a roaming network service provider. The computer program product can also measure, using the processor, with the roaming network telecom service provider the subscribers that are present within a roaming network geography; and rank, using the processor, subscribers in the roaming network geography by their duration within the roaming network geography. The computer program product can also generate, using the processor, promotion pools for the subscribers within the roaming network based on their preferences; and match, using the processor, promotional offers to the subscribers in the promotional pools based using the ranking of subscribers and the promotional preferences.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

In some embodiments, the methods, systems and computer program products can enhance the reach for a roaming subscriber and organization for receiving promotional messages, such as short message service (SMS)(cellular phone text messaging) by telecommunications. As used herein, "telecom" denotes a telecommunications provider. Telecommunications companies include companies that transmit data in words, voice, audio, or video across the globe. Telecom equipment, telecom services, and wireless communication are the three basic elements of telecommunications, and a telecom company typically provides at least one of the above elements. A "promotional message" may be any offer to the user for a goods or service. For example, the promotional message may be an offer for food purchase, dining services, hotel stays, consumer good purchases, etc.

"Roaming" enables a mobile subscriber to automatically make and receive voice calls, send and receive data, or access other services when travelling outside the geographical coverage area of their home network, by means of using a visited network. In more technical terms, roaming refers to the ability for a cellular customer to automatically make and receive voice calls, send and receive data, or access other services, including home data services, when travelling outside the geographical coverage area of the home network, by means of using a visited network. For example: should a subscriber travel beyond their cell phone company's transmitter range, their cell phone would automatically hop onto another phone company's service, if available.

In some embodiments, the roaming process is supported by the telecommunication processes of mobility management, authentication, authorization, and accounting billing procedures (known as AAA or 'triple A'). Roaming can be divided into "SIM-based roaming" and "username/password-based roaming", whereby the technical term "roaming" also encompasses roaming between networks of different network standards, e.g. WLAN (Wireless Local Area Network) or GSM (Global System for Mobile Communications). Device equipment and functionality, such as SIM card capability, antenna and network interfaces, and power management, determine the access possibilities. For the purposes of roaming there are home and visited networks. "Home network" refers to the network the subscriber is registered with. "Visitor network" refers to the network a subscriber roams temporarily and is outside the bounds of the "home network".

Prior to the methods, systems and computer program products of the present disclosure, systems did not exist to connect the subscribers and organization within the boundary of the subscriber consent/preference during the limited time period when the subscriber is roaming outside those boundaries to maximize the reach of the promotional message. The methods, systems and computer program products of the present disclosure connect local service provides/telemarketers to a roaming subscriber for providing promotional messages as per the subscriber's consent/preference. In some embodiments, the methods, systems and computer program products of the present disclosure provide a monetization option (new business model) for the telecom service providers by extending subscriber's preference information to be leveraged by telemarketers for target advertising.

In roaming conditions, prior to the methods, systems and computer program products of the present disclosure, the roaming service provider including the local brands and product telemarketers do not have any knowledge about the roaming subscriber's preference that can enable information of local brands/products that match roaming subscriber's preference setting resulting in benefits to both the parties. The methods and systems differ in at least this aspect. The methods, systems and computer program products described herein employ an optimization algorithm that is fed by temporal and spatial factors to create a niche pool of subscribers in roaming scenarios that can be used by telemarketers/entities to send promotional offer messages. A scrubbing mechanism is employed that is based on the subscriber's preferences to create a dynamic target pool of subscribers that can be auctioned to the telemarketers. The method utilize roaming subscriber preferences to create a niche customer pool for the promotional organization, and dynamically adjust the roaming subscriber's volatility distribution across the regular and privileged promotional organizations/entities as per the preferences of roaming subscribers. The method, systems and computer program products of the present disclosure are now described in greater detail with reference to FIGS. 1-8.

Figure 1:
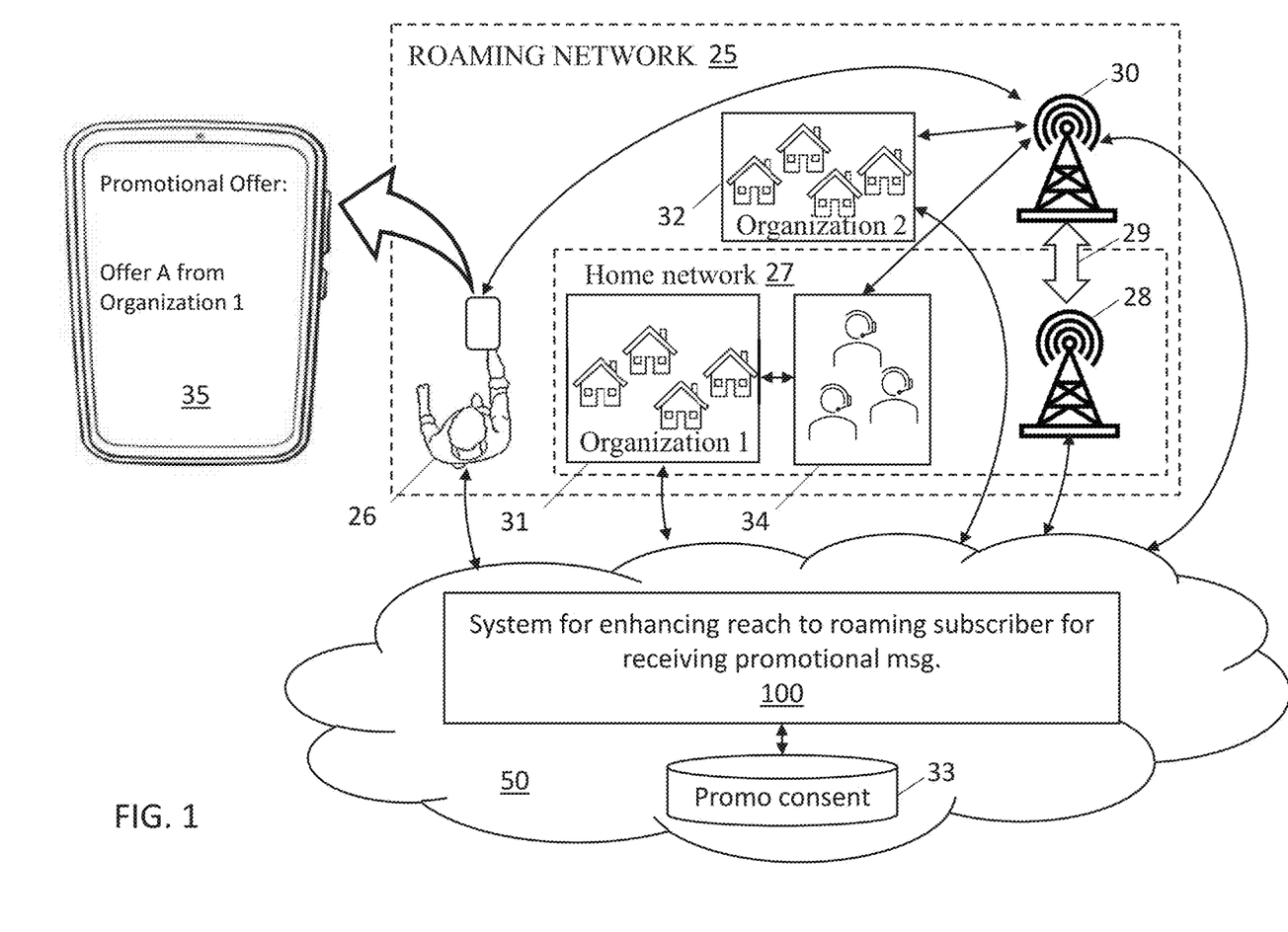
FIG. 1 is a diagram illustrating an exemplary environment, where a system provides for sending promotional messages to a user/subscriber of telecom services beyond the user's home network when the user is roaming via a visitor network, in accordance with one embodiment of the present disclosure.
Figure 2:
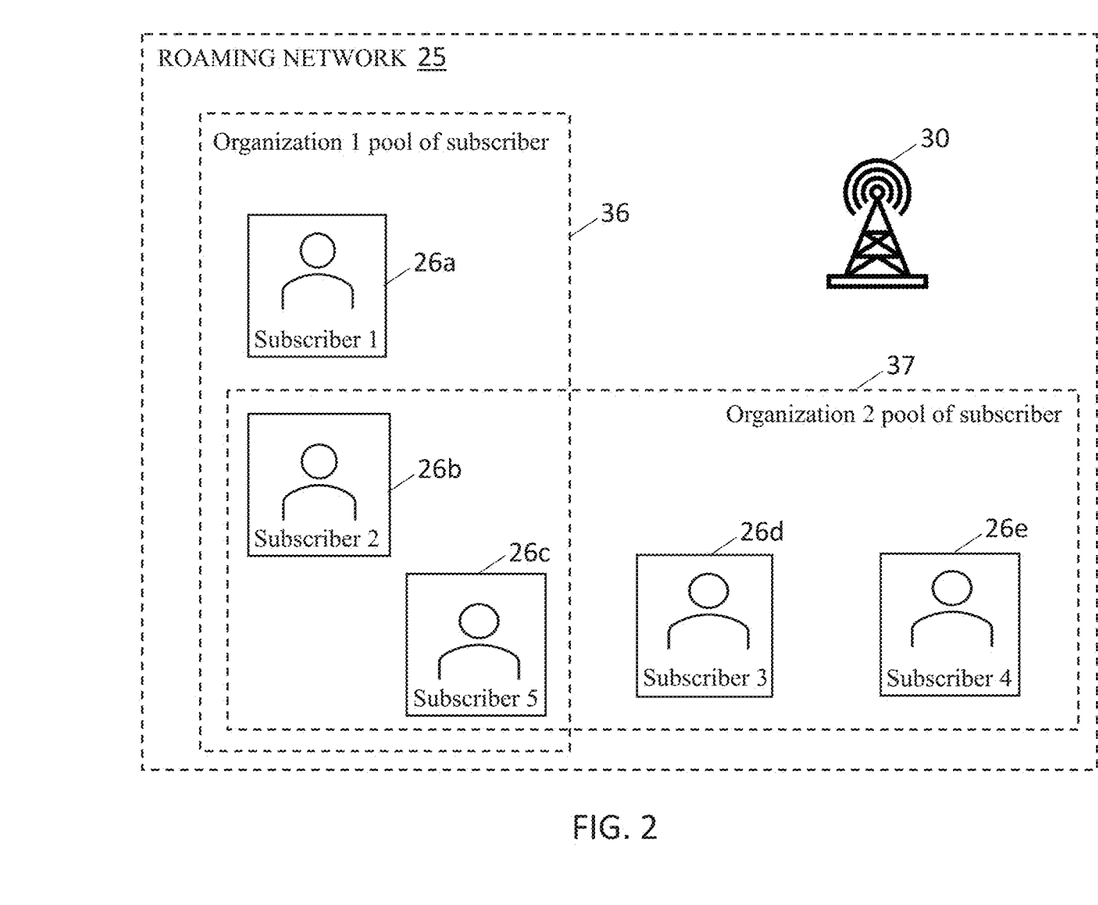
FIG. 2 is a diagram illustrating promotional pools for sending promotional messages to a user/subscriber of telecom services beyond the user's home network when the user is roaming via a visitor network.
Figure 3:
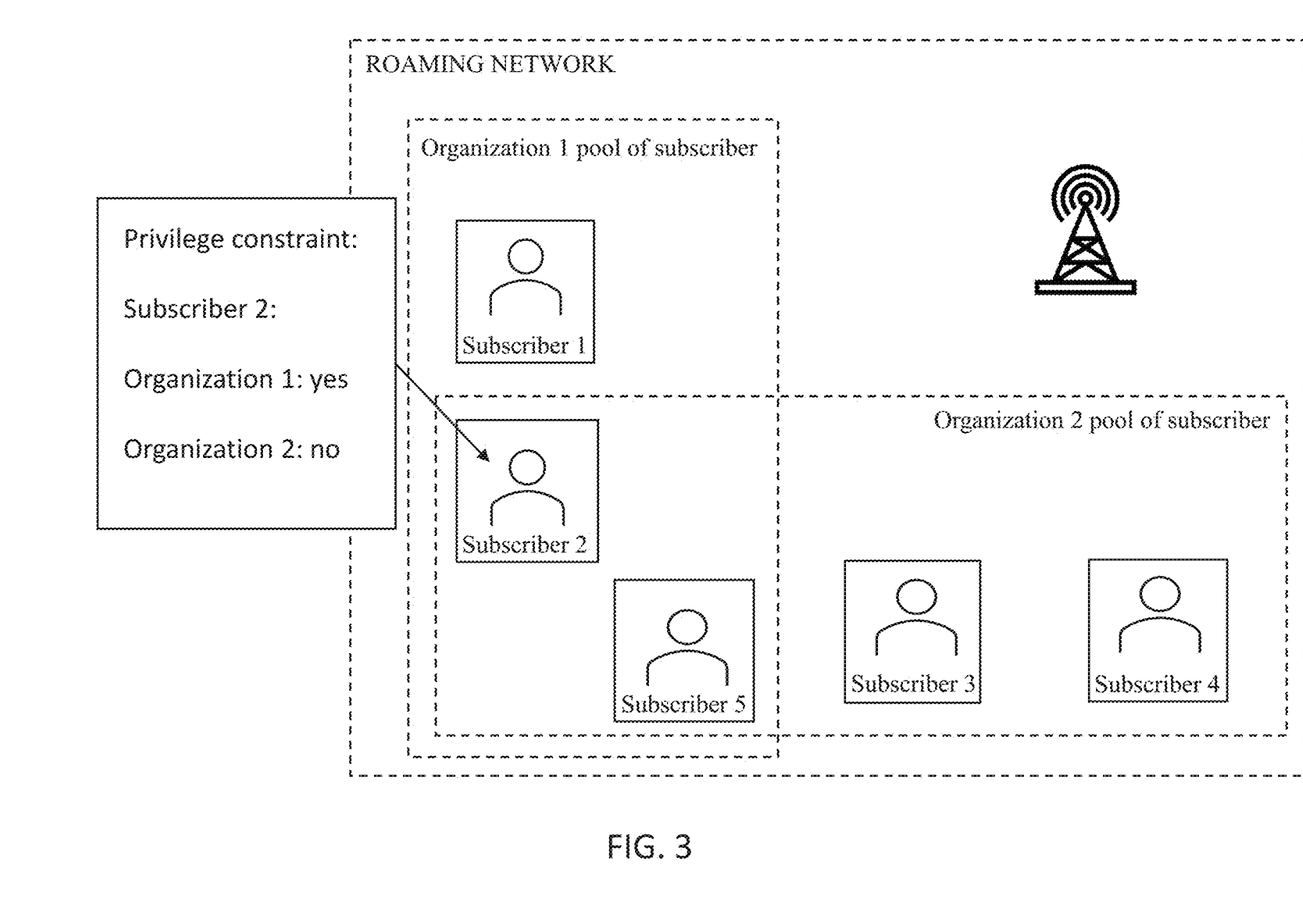
FIG. 3 is a diagram illustrating matching a user's promotional preferences to offers received from organizations within the promotional pools.
Figure 4:
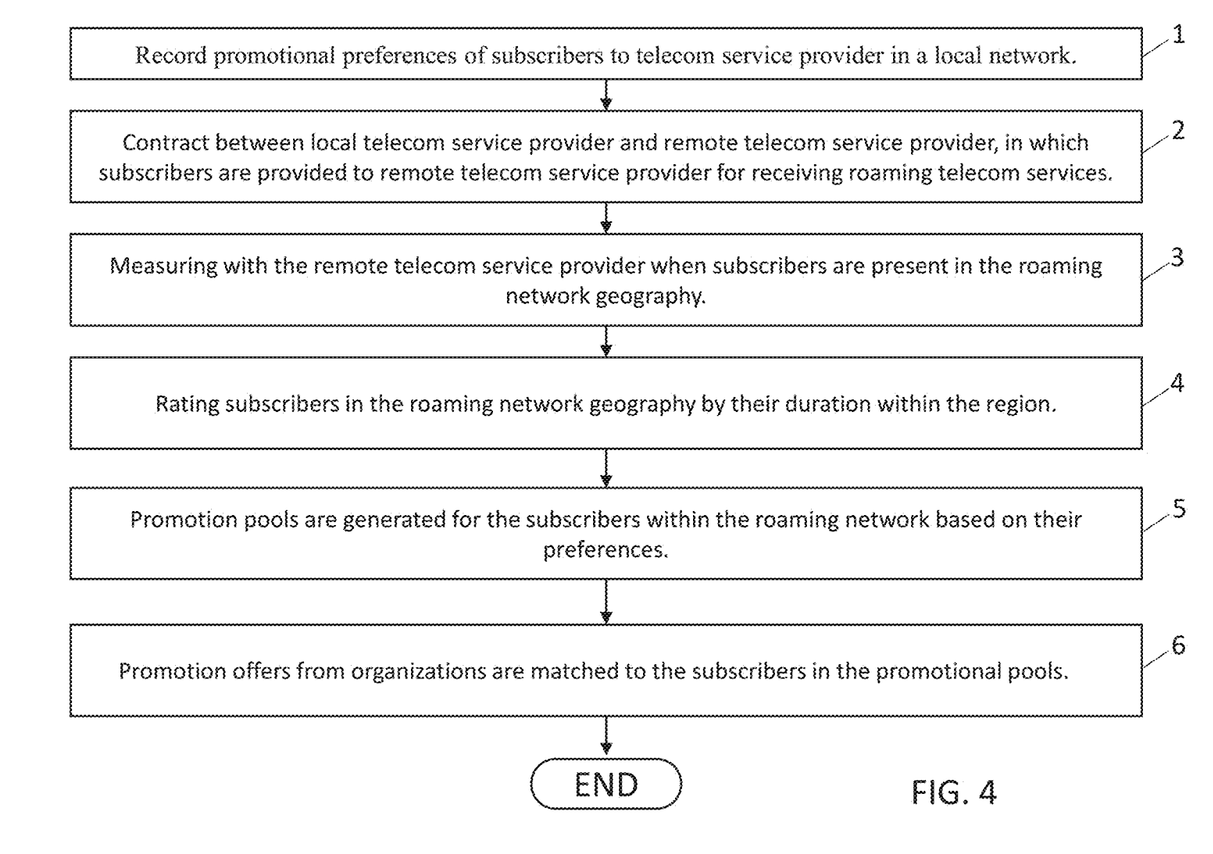
FIG. 4 illustrates a method for enhancing the reach of promotional telecommunications messages beyond the user's home network to roaming subscription users, in accordance with one embodiment of the present disclosure.
Figure 5:
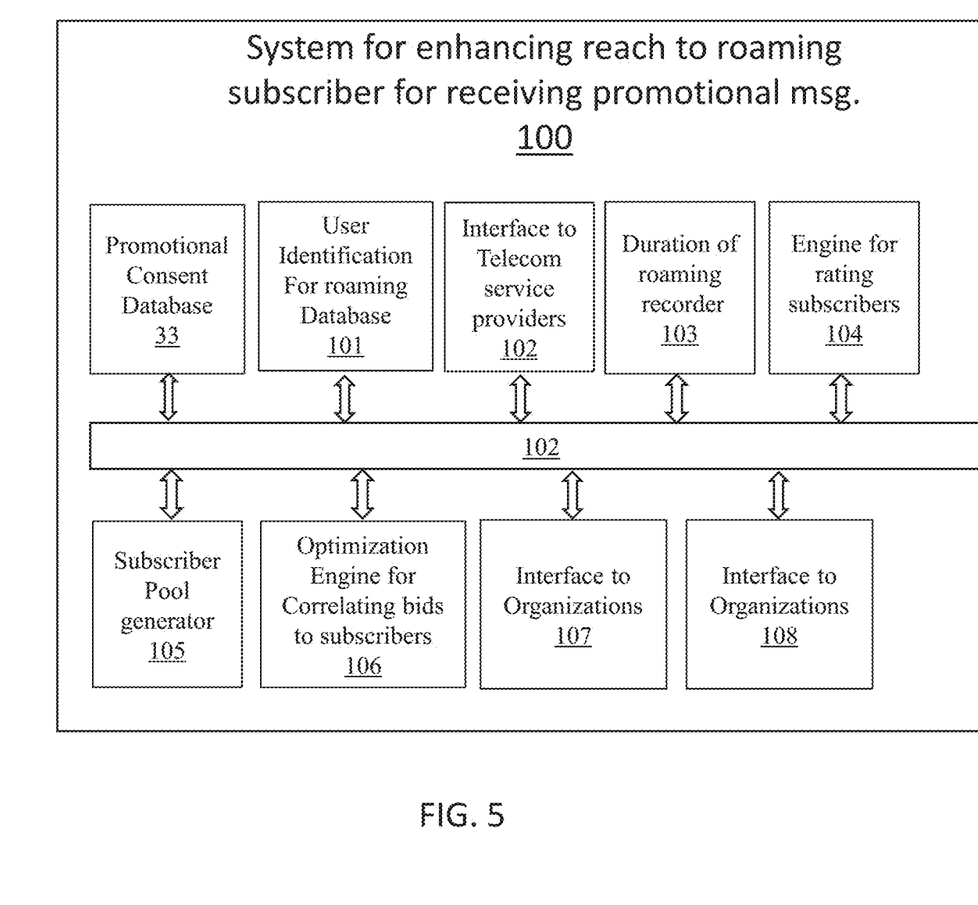
FIG. 5 illustrates a system for enhancing the reach of promotional telecommunications messages beyond the user's home network to roaming subscription users, in accordance with one embodiment of the present disclosure.

FIGS. 1-3 are diagrams illustrating an exemplary environment, where a system provides for sending promotional messages to a user of telecom services beyond the user's home network when the user is roaming via a visitor network. FIG. 4 illustrates a method for enhancing the reach of promotional telecommunications messages beyond the user's home network to roaming subscription users. FIG. 5 illustrates a system for enhancing the reach of promotional telecommunications to roaming subscription users, which may be employed with the method described with reference to FIG. 4.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

FIG. 1 is a diagram illustrating an exemplary environment of a broadcast approach to connect organizations. In the embodiment depicted in FIG. 1, the subscriber 26 (also referred to as user) can travel to a remote location, e.g., into a roaming network 25, but can continue to use its home mobile number by means of international roaming. When the user 26 is in an area that's covered by your cell phone carrier, the user 26 is "in-network.". This is identified by reference number 27. As soon as, the user 26 ventures out of this area, the user are "roaming". "International roaming" is simply when the user 26 is using their cell phone carrier's service in international countries. In the case depicted in FIG. 1, the home telecom service provider 28 has contracts 29 with remote telecom service providers 30 to fulfill the subscriber access in remote locations, e.g., the roaming network 25.

In the example, depicted in FIG. 1, in the remote location, e.g., roaming within the remote network 25, from the subscriber 26 perspective, the user 26 would like to receive promotional messages based on the user's preferences/consent. A user 26 typically has an associated file of consent for promotional messages, e.g., the user has indicate the type of promotions they would like to receive through their telecom service, and the user has indicated the type of promotions they would not like to receive through their telecom service. In one example, the associated file of consent for promotional messages may be in memory storage 33 that is cloud based 50. In the example depicted in FIG. 1, there is an in network organizations 31, and there are out of network organizations 32. Each organization 31, 32 may have a promotion that can be marketed to the users 10 through callers, e.g., telemarketers 34. The organizations 31, 32 generally would like their promotions communicated to the subscribers/users 26 that are within their region, e.g., within the home network 27 or the roaming network 25. In the embodiment that is depicted in FIG. 1, the telemarketers 34 are present in the home network 27, however, embodiments have been contemplated, in which the telemarketers 34 are also present in the roaming network 25.

The remote telecom service provider (TSP) 30 has within its range data on the current subscriber, e.g., user/subscriber 26 presence, within its geography, e.g., the roaming network geography 25. As noted above, the remote telecom service provider (TSP) 30 has contracts 29 with the home network telecom service provider (TSP) 28, which provide the remote telecom service provide (TSP) identity information on the users/subscribes 26 that is used by the remote telecom service providers (TSP) 30 to identify the users from the home network. The contracts 29 provide an opportunity for the users to register with the system for extending the reach of promotional offers into roaming networks. This registration step provides the subscribers to opt in and/or opt out of data collection, which can be personal information. To the extent implementations of the invention collect, store, or employ personal information provided by, or obtained from, individuals (for example, current locations of drivers, historical records of drivers, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The remote telecom service provider (TSP) 30 can actively engage in creating a connections between the subscriber 26 and the organizations 31, 32 by ways of the broadcast system.

The users/subscribers 26, the telecom service providers 28, 30 and the organizations 31, 32 may be in communication with a system 100 for enhancing reach to roaming subscribers 26 for receiving promotional messages. The system 100 for enhancing reach to roaming subscribers 26 has access to the database 33 of privileges for promotional offer types that is correlated to the user/subscriber 26. The database of privileges can be collected from the roaming subscribers 26 directly via communication over the internet directly with the system 100, or the privileges can be collected from the local telecom service provides 28. Using the system 100, the promotional offers 35 are extended from a telemarketer 34 across the remote telecom service provider (TSP) 30 to the user 26. In the example depicted in FIG. 1, the promotional offer 35 is from the organization 31, i.e., organization 1, in the home network geography 27, while the subscriber/user 26 is in the roaming network geography 25.

FIG. 4 illustrates one embodiment of a method for enhancing the reach of promotional telecommunications messages beyond the user's home network to roaming subscription users. Block 1 of FIG. 4 describes recording promotional preferences of subscribers to telecom service providers in a local network. As depicted in FIG. 1, the promotional preferences can be stored in a promotional consent database 33 that is cloud based. However, the system 100 for enhancing reach to roaming subscribers for receiving promotional messages depicted in FIG. 5 may also provide for the storage of the promotional consent database 33.

As illustrated in FIG. 4, the method may further include block 2. Block 2 includes contracts between the local telecom service provider 28, and the remote telecom service provider 30, in which subscribers 26 are provided to remote telecom service provider for receiving roaming telecom services. Those contracts may provide the identity for the subscribers that is used by the remote telecom service provider 30 to determine when users/subscribers 26 are present in the roaming network geography 25. Also, the contractual relationship may also provide the basis upon which the system 100 can receive data directed to the users/subscribers 26 promotional offer consent. Referring to FIG. 5, to provide for receiving this data, the system 100 for enhancing reach to roaming subscribers for receiving promotional messages includes an interface 102 with the telecom service providers 28, 30. The interface 102 can be to both the local telecom service provider 28 and the remote telecom service provider 30. The system 100 for enhancing reach to roaming subscribers for receiving promotional messages also includes at least one form of storage for storing this identity information, e.g., the user identification for roaming database 101.

At block 3 of the method depicted in FIG. 4, the method may further include measuring with the remote telecom service provider 30 when subscribers 26 are present in the roaming network geography 25, and block 4 includes rating subscribers in the roaming network geography by their duration within the region. Referring to FIG. 5, the system 100 includes duration of roaming recorder 103, which can be provided by a timer. As noted, the system 100 receives updates through the telecom service provider interface 102 when subscribers are entering roaming geographies. The same is true for when subscribers leave the roaming geographies. The system 100 also includes an engine for rating subscribers 104. The engine rates subscribers 104 based on their travel in roaming geographies.

FIG. 2 illustrates another embodiment of the present disclosure, that further elaborates on the enhancement in the range of promotional offers that is depicted in FIG. 1. In FIG. 2, during roaming to an international location, through the system 100 for enhancing reach to roaming subscribers and the telecom service provider 30, an auction based embodiment is provided in which the organizations 31, 32 has a pool of N subscribers, which provides a one-to-one connect between the subscribers and itself. In this embodiment, the organizations 30, 31 increase their reach to these pool of subscribers 36, 37 following the filter laid by the subscriber consent/preference.

Referring to FIG. 4, the promotion pools 36, 37 are generated for the subscribers within the roaming network based on their preferences. The system 100 having access to both the subscriber preferences, e.g., the promotional consent database 33, and having updates on duration and presence in the roaming network geography from the interface to the telecom service providers 102 employs a subscriber pool generator 105 to generate pools of subscribers having similar promotional consent in the same roaming networks.

FIG. 2 illustrates a pool based approach for extending promotional offers to roaming subscribers through a telecom service provider 30 for the roaming network geography 25. FIG. 2 illustrates two pools, e.g., organization 1 pool of subscribers 36, and organization 2 pool of subscribers 37, of subscribers 26a, 26b, 26c, 26d, 26e. In the example depicted in FIG. 2, the subscriber having reference number 26a is the only subscriber that is only within the organization 1 pool of subscribers 36. This means that in the example depicted in FIG. 2, the subscriber having reference number 26a can only receive promotions from organization 31, as depicted in FIG. 1. In the example depicted in FIG. 2, the subscriber having reference numbers 26d and 26e are the subscribers that are only within the organization 2 pool of subscribers 37. This means that in the example depicted in FIG. 2, the subscriber having reference numbers 26c and 26d can only receive promotions from organization 32, as depicted in FIG. 1. The subscribers having reference numbers 26b and 26c are within both the organization 1 pool of subscribers 36, and the organization 2 pool of subscribers 37. In the example depicted in FIG. 2, the subscribers 26b and 26c can receive promotional offers from both organization 1 31 and organization 2 32. The promotional offers can be sent to the subscribers 26a, 26b, 26c 26d, 26e using the roaming telecom service provider 30, as the subscribers 26a, 26b, 26c, 26d, 26e are in the roaming network geography 25, e.g., international roaming network geography.

At block 6 of FIG. 4, the method may continue with promotion offers from organizations 31, 32 being matched to the subscribers 26a, 26b, 26c, 26d, 26e in the promotional pools 36, 37. Referring to FIG. 5, the system 100 may include an interface to the organization 31, 32. The interface may be by web based communication. Through the interface 107, the system 100 can receive promotional offers. The promotional offers can then be analyzed using the optimization engine for correlating bids to subscribers 106.

FIG. 3 illustrates an embodiment of the present disclosure, in which promotional offers are extended to subscribers in the promotional pools using a privileged based access method, in which the promotions are transmitted to subscribers 26a, 26b, 26c, 26d, 26e having matching privileges by the remote telecom service provider 25, as the subscribers are in the roaming network geography 25. Continuing with the approach illustrated in FIG. 2, in the embodiments consistent with FIG. 3, the pools of subscribers, e.g., organization 1 pool of subscribers 36, and organization 2 pool of subscribers 37, are in communication with the telecom service provider 30. However, in the embodiment depicted in FIG. 3, even through multiple subscribers may be within multiple pools correlated to the different organization, only subscribers that have preferences for an organization can receive the organization's promotion.

In some embodiments, the method extends to target groups beyond the home subscriber base for telemarketers with roaming subscribers. In some embodiments, the method enables roaming telecom operators to match the roaming subscriber's preference with entities providing similar services/products, subscriber selection driven by affinity development. Affinity development is when a new subscriber coming into the roaming network is compared with subscribers already within the roaming network. The new subscriber is compared to the existing subscribers within the roaming network by time that the parties are already roaming (X hours), temporal distribution and spatial distribution. For example, a party that is traveling through a plurality of roaming networks may have a lesser time period within the roaming network. That information could be interpreted differently for the purposes of delivering promotional messages. For example, if the subscriber 26 is recently within a roaming network for only a short time, and perhaps information has been provided that the same subscriber was in the prior roaming network for a short period, would be indicative that the subscriber 26 is passing through the roaming network. With that information it may be advantageous to prioritize sending promotional messages to that subscriber. For example, if the promotional message is for an organization that is within the roaming network, it may be advantageous to get the promotional message to the subscriber quickly, so that it is received while the user is within the roaming network. Conversely, it may be more advantageous to put a priority to sending promotional messages to subscribers that have spent a greater amount of time within a region, e.g., roaming network, because from that information it can be assumed the subscriber will be in a roaming network geography for a significant amount of time during which the user could benefit from the promotion in that region.

Referring to FIG. 1, the system for enhancing reach to roaming subscribers for receiving promotional messages 100 includes a database for preferences of the users to receive promotional offers 33. In some embodiments, the system 100 can use preference selection to determine travel intent to drive the organization/product shortlist for promotions to the users/subscribers.

In some embodiments, the methods of the present disclosure use preferential settings to create niche customer pool for entities taking premier service while looking to nullify bias.

Further, the methods, systems and computer program products also employ an optimization algorithm fed by temporal and spatial factor to dynamically adjust the roaming subscriber pool volatility distribution across the regular and privileged entity set. This step of the methods and systems of the present disclosure can be provided by the optimization engine for correlating bids to subscribers 106.

In some embodiments, the promotions are forwarded to subscribers using an auction-based mechanism for targeting customers. The auction-based mechanism for targeting customers may employ equation 1:

$$C=\{c_1, c_2, \ldots, c\_n\} \qquad \text{Equation (1)}$$

C is the set of customer available for limited time period at location L. Location L is within the roaming network geography 25. The customer may be user 26, as depicted in FIGS. 1-3. The location (L) of the customer can be detected by the telecom service provider (TSP) 30 within the roaming network geography 25.

The auction based mechanism for targeting customers also includes equation 2:

$$E=\{E_1, E_2, \ldots, E\_m\} \qquad \text{Equation (2)}$$

E is the set of entities, e.g., organizations 31, 32, registered with the telecom service provider for seeing promotional messages.

Based on the customer consent data in the base location, e.g., the home network 27, the telecom service provider 30 in the roaming network 25 can identify the pool of subscribers that can be targeted by each entity, e.g., organization 31, 32, such as the organization pools 36, 37 that are depicted in FIG. 2.

The auction based mechanism for targeting customers further includes equation (3):

$$S_j \subseteq C, j=1, \ldots, m \qquad \text{Equation (3):}$$

Where $S_j$ is a set of customers that can be targeted for promotion by the entity j (e.g., organization 31, 32).

In some embodiments, each customer (subscriber) has the additional constraint on the number of promotions they can receive. Each entity E_j has a contract with the telecom service provider 30 to send promotional messages to at least N_j customers per day.

In some embodiments, the auction based mechanism for targeting customers includes an auction bidding phase. In the auction bidding phase, each entity submits bids for a number of customers it wants to target, as well as submitting bids for privilege based access. Each bid is in the form of the number of customers, the privilege type and the bid value.

The auction based mechanism for targeting customers may also include a periodic auction allocation phase. The telecom service provider 30 can collect the active bids and customer set.

The telecom service provide can run an optimization model. This step of the methods and systems of the present disclosure can be provided by the optimization engine for correlating bids to subscribers 106. The objective of the optimization mode it to maximize the overall revenue. In some embodiments, there may be three constraints. The first constraint can be the number of message sent to a customer, which must be less than a specified limit. The second constraint can be if an entity, e.g., organization 31, 32, is selected all the conditions in the bid are satisfied. The third constraint can be if the customer matching to the promotion by the organization is consistent with the consent data.

One example of an optimization model can include to tuple (B_j, N_j, P_j), which provides the bid submitted by each entity j, e.g., organization 31, 32. B_j is the bid value. N_j is the minimum number of customers to be selected. P_j indicates if privilege access is required or not. Privilege access is based on the promotion consent database 33.

The optimization model can include decisions variables, as follows: x_j=1 if big or entity E_j is selected; and Y_ij=1 if entity E_j sends a promotional message to customer C_i. Customer C_i may be any of the users/subscribers 26a, 26b, 26c, 26d, 26e.

In one embodiment, the optimization model may include the following objective equation:

$$\text{MAX } \Sigma B_j * x_j \qquad \text{Equation (4):}$$

which is subject to:

$$\Sigma_{i \in S_j} y_{ij} \geq N_j * x_j \forall E_j$$

$$\Sigma_j y_{ij} \leq M_i \forall C_i$$

$$\Sigma_k y_{ik} \leq M * y_{ij} * (1-P_j) + 1, \forall E_j, C_i$$

Once an optimized set of promotional offers are matched to subscribers 26a, 26b, 26c, 26d, 26e, the relevant subscribers, and their contact information may be sent to the organizations 31, 32. As illustrated in FIG. 5, the system 100 includes an interface 107 to the organizations. The system sends the optimized set of promotional offers to the organizations 31, 32. The organizations 31, 32 can use any telemarketer they wish to use to reach out to the matching subscribers 26a, 26b, 26c, 26d, 26e.

The system 100 that is depicted in FIG. 5 may also include memory device and at least one processor 209, e.g., hardware processor. As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 6:
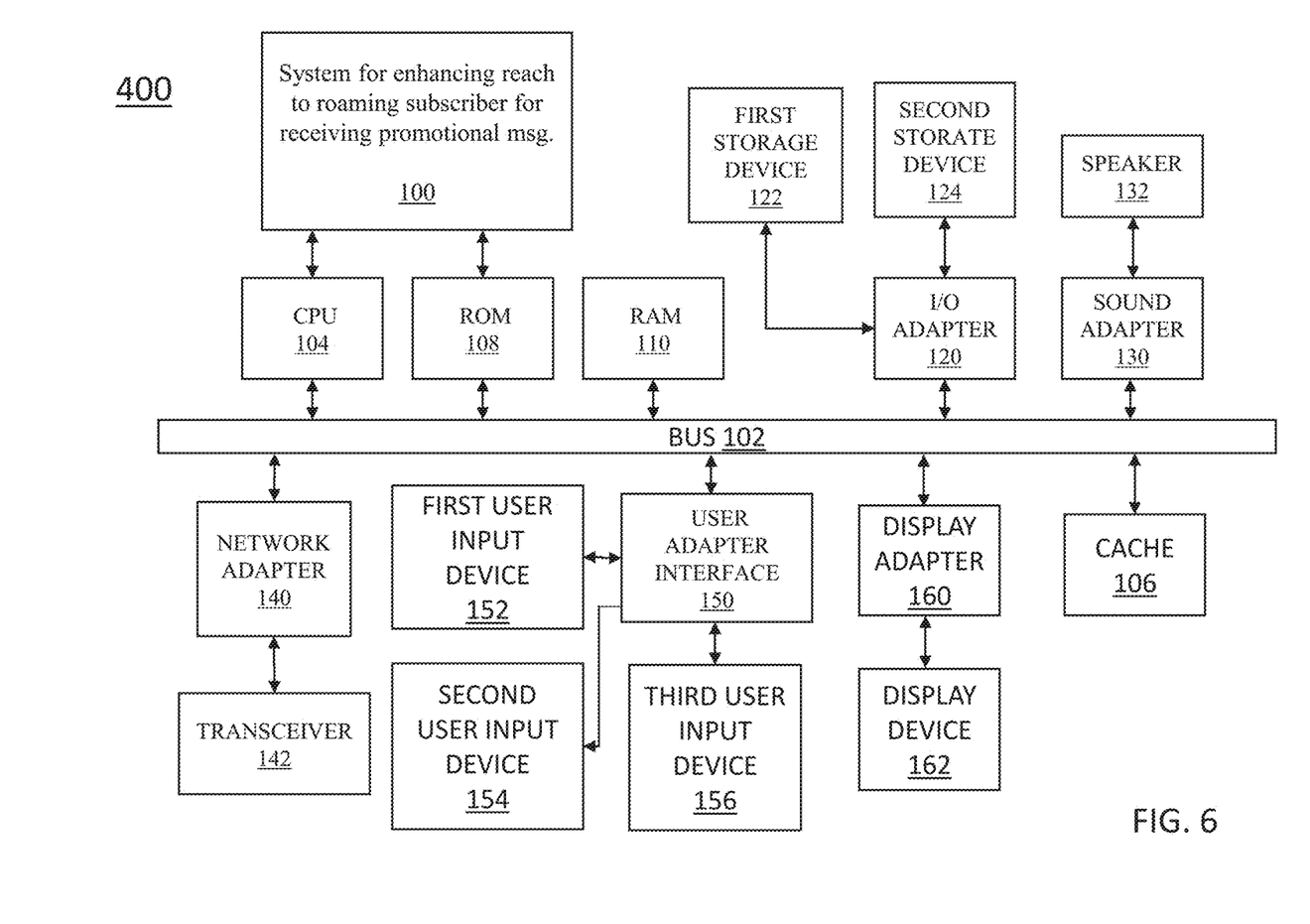
FIG. 6 is a block diagram illustrating a system that can incorporate the system for issuing promotional offers that is depicted in FIG. 5, in accordance with one embodiment of the present disclosure.

FIG. 6 is a block diagram illustrating a system that can incorporate the system 100 for issuing promotional offers that is depicted in FIG. 5. FIG. 6 depicts one embodiment of an exemplary processing system 400 to which the present invention may be applied is shown in accordance with one embodiment. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. In the embodiment that is depicted in FIG. 6, the system 200 for issuing promotional offers is also in communication with the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid-state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention. In some embodiments, the present disclosure can provide a computer program product is described for presenting regional based promotional offers. In one embodiment, the computer program product includes a computer readable storage medium having computer readable program code embodied therewith, the program instructions executable by a processor to cause the processor to record promotional preferences of subscribers for receiving promotional calls; and forward subscriber information from a local network telecom service provider to a roaming network service provider. The computer program product can also measure, using the processor, with the roaming network telecom service provider the subscribers that are present within a roaming network geography; and rank, using the processor, subscribers in the roaming network geography by their duration within the roaming network geography. The computer program product can also generate, using the processor, promotion pools for the subscribers within the roaming network based on their preferences; and match, using the processor, promotional offers to the subscribers in the promotional pools based using the ranking of subscribers and the promotional preferences.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for enhancing reach of local service providers for targeting subscribers in roaming scenarios (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for making promotional offers to telecom subscribers in roaming network areas comprising:
   recording promotional preferences of subscribers for receiving promotional calls, the promotional preferences being directly recorded from subscribers by their local telecom provider by contract with the local telecom provider, the promotional preferences including at least one type of promotion the subscriber would like to receive, and at least one type of promotion that subscriber would not like to receive;
   enhancing a reach of local promotional service providers to telecom subscribers in roaming network areas based on the recorded promotional preferences of subscribers through a cloud based system by:
      forwarding subscriber information from a local network telecom service provider to a roaming network service provider;
      measuring with the roaming network telecom service provider the subscribers that are present within a roaming network geography;
      detecting a duration of the subscriber within the roaming network geography based on communicated updates by a remote telecom service provider to the cloud based system;
      ranking subscribers in the roaming network geography by their duration within the roaming network geography, the subscribers ranked using an optimization model to maximize revenue based on number of telecom messages received by a subscriber, the number of promotions meeting promotional preferences of the subscriber, and by whether the duration of the subscriber is for a subscriber newly entering the roaming network geography;
      generating promotion pools for the subscribers within the roaming network based on their preferences; and
      matching promotional offers to the subscribers in the promotional pools, through an auction for organizations to submit bids for the promotional offers that is saved to a database based on a number of promotional calls made to the subscribers, using the ranking of subscribers and the promotional preferences.

2. The computer-implemented method of claim 1, wherein matching the promotional offers comprises an auction for organizations to submit bids for promotional offers that includes a periodic auction allocation phase.

3. The computer-implemented method of claim 1 further comprising sending promotional offers to subscribers using the roaming network service provider.

4. The computer-implemented method of claim 1, wherein the promotional preferences are saved in a promotional consent database.

5. A system for making promotional offers to telecom subscribers in roaming network areas comprising:
   a hardware processor; and
   a memory that stores a computer program product, which, when executed by the hardware processor, causes the hardware processor to:
   record promotional preferences of subscribers for receiving promotional calls, the promotional preferences being directly recorded from subscribers by their local telecom provider by contract with the local telecom provider, the promotional preferences including at least one type of promotion the subscriber would like to receive, and at least one type of promotion that subscriber would not like to receive;
   enhance a reach of local promotional service providers to telecom subscribers in roaming network areas based on the recorded promotional preferences of subscribers through a cloud based system by causing the hardware processor to:
      forward subscriber information from a local network telecom service provider to a roaming network service provider;

measure with the roaming network telecom service provider the subscribers that are present within a roaming network geography;
detect a duration of the subscriber within the roaming network geography based on communicated updates by a remote telecom service provider to the cloud based system;
rank subscribers in the roaming network geography by their duration within the roaming network geography, the rank of the subscribers using an optimization model to maximize revenue based on number of telecom messages received by a subscriber, the number of promotions meeting promotional preferences of the subscriber, and by whether the duration of the subscriber is for a subscriber newly entering the roaming network geography;
generate promotion pools for the subscribers within the roaming network based on their preferences; and
match promotional offers to the subscribers in the promotional pools, through an auction for organizations to submit bids for the promotional offers that is saved to a database based on a number of promotional calls made to the subscribers, using the ranking of subscribers and the promotional preferences.

6. The system of claim 5, wherein matching the promotional offers comprises an auction for organizations to submit bids for promotional offers that includes a periodic auction allocation phase.

7. The system of claim 5, further comprising sending promotional offers to subscribers using the roaming network service provider.

8. The system of claim 5, wherein the promotional preferences are saved in a promotional consent database.

9. A computer program product for making promotional offers to telecom subscribers in roaming network areas comprising a computer readable storage medium having computer readable program code embodied therewith, the program instructions executable by a processor to cause the processor to:
record, using the processor, promotional preferences of subscribers for receiving promotional calls, the promotional preferences being directly recorded from subscribers by their local telecom provider by contract with the local telecom provider, the promotional preferences including at least one type of promotion the subscriber would like to receive, and at least one type of promotion that subscriber would not like to receive;
enhance a reach of local promotional service providers to telecom subscribers in roaming network areas based on the recorded promotional preferences of subscribers through a cloud based system by causing the hardware processor to:
forward, using the processor, subscriber information from a local network telecom service provider to a roaming network service provider;
measure, using the processor, with the roaming network telecom service provider the subscribers that are present within a roaming network geography;
detect a duration of the subscriber within the roaming network geography based on communicated updates by a remote telecom service provider to the cloud based system;
rank, using the processor, subscribers in the roaming network geography by their duration within the roaming network geography, the subscribers ranked using an optimization model to maximize revenue based on number of telecom messages received by a subscriber, the number of promotions meeting promotional preferences of the subscriber, and by whether the duration of the subscriber is for a subscriber newly entering the roaming network geography;
generate, using the processor, promotion pools for the subscribers within the roaming network based on their preferences; and
match promotional offers to the subscribers in the promotional pools, through an auction for organizations to submit bids for the promotional offers that is saved to a database based on a number of promotional calls made to the subscribers, using the ranking of subscribers and the promotional preferences.

10. The computer program product of claim 9, wherein matching the promotional offers comprises an auction for organizations to submit bids for promotional offers that includes a periodic auction allocation phase.

11. The computer program product of claim 9 further comprising sending promotional offers to subscribers using the roaming network service provider.

12. The computer program product of claim 9, wherein the promotional preferences are saved in a promotional consent database.

13. The computer-implemented method of claim 1, wherein ranking subscribers in the roaming network geography further comprises prioritizing subscribers based on a temporal distribution of the subscribers.

14. The computer-implemented method of claim 1, wherein ranking subscribers in the roaming network geography further comprises prioritizing subscribers based on a spatial distribution of the subscribers.

15. The system of claim 5, wherein causing the hardware processor to rank subscribers in the roaming network geography further comprises prioritizing subscribers based on a temporal distribution of the subscribers.

16. The system of claim 5, wherein causing the hardware processor to rank subscribers in the roaming network geography further comprises prioritizing subscribers based on a spatial distribution of the subscribers.

17. The computer program product of claim 9, wherein to cause the processor to rank subscribers in the roaming network geography further comprises prioritizing subscribers based on a temporal distribution of the subscribers.

* * * * *